(12) United States Patent
Garani

(10) Patent No.: US 7,626,972 B2
(45) Date of Patent: Dec. 1, 2009

(54) DOWNLOADING WEB PAGES

(75) Inventor: Pradeep Garani, Bangalore (IN)

(73) Assignee: Motorola, Inc., Schaumburg, IL (US)

( * ) Notice: Subject to any disclaimer, the term of this patent is extended or adjusted under 35 U.S.C. 154(b) by 1445 days.

(21) Appl. No.: 10/257,748

(22) PCT Filed: Apr. 18, 2001

(86) PCT No.: PCT/EP01/04893

§ 371 (c)(1),
(2), (4) Date: Mar. 17, 2003

(87) PCT Pub. No.: WO01/80518

PCT Pub. Date: Oct. 25, 2001

(65) Prior Publication Data

US 2003/0165133 A1 Sep. 4, 2003

(30) Foreign Application Priority Data

Apr. 18, 2000 (EP) .................................. 00401070

(51) Int. Cl.
*H04B 7/212* (2006.01)
(52) U.S. Cl. ...................... 370/347; 370/338; 370/329; 370/431
(58) Field of Classification Search .................. None
See application file for complete search history.

(56) References Cited

U.S. PATENT DOCUMENTS

| 5,574,774 | A | 11/1996 | Ahlberg et al. | |
| 6,683,860 | B1 * | 1/2004 | Forssell et al. | 370/329 |
| 6,771,659 | B1 * | 8/2004 | Parantainen et al. | 370/466 |
| 7,054,268 | B1 * | 5/2006 | Parantainen et al. | 370/231 |
| 2003/0156557 | A1 * | 8/2003 | Kalden et al. | 370/329 |

FOREIGN PATENT DOCUMENTS

| EP | 0 872 982 A | 10/1998 |
| EP | 0 987 858 A | 3/2000 |
| EP | 1 021 017 A | 7/2000 |
| WO | WO 00 54464 A | 9/2000 |

OTHER PUBLICATIONS

"Digital Cellular Telecommunications System (Phase 2+); General Packet Radio Service (GPRS); Mobile Station (MS)—Base Station System (BSS) Interface; Radio Link Control/Mediu, Access Control (RLC/MAC) Protocol (GSM 04.60 Version 6.3.1 Release 1997)" *European Telecommunication Standard*, Jun. 1999, pp. 1-185.

(Continued)

*Primary Examiner*—Duc C Ho
(74) *Attorney, Agent, or Firm*—Hisashi D. Watanabe

(57) ABSTRACT

The method of enhancing sessions or applications protocols which use successive transmission control protocol connections within a session on time division multiple access wireless packet data systems or wireline modem access protocols, wherein temporary block flows are chained. The present invention provides for a method and system for utilising sessions or applications protocols which use successive transmission control protocol connections within a session on time division multiple access wireless packet data systems or wireline modem access protocols. The method and system have the advantages of reducing the download time for web pages and reducing the number of random access contentions experienced.

19 Claims, 6 Drawing Sheets

OTHER PUBLICATIONS

Ludwig et al. "Link Layer Analysis of the General Packet Radio Service for GSM" *IEEE International Conference on Universal Personal Communications, US, New York, IEEE*, vol. CONF 6, Oct. 1997, pp. 525-530.

"Digital Cellular Telecommunications System (Phase 2+); General Packet Radio Service (GPRS); Overall description of the GPRS radio interference; Stage 2; (GSM 03.64 version 7.0.0 Release 1998)" *European Telecommunication Standard*. Jul. 1999, pp. 1-42.

* cited by examiner

DOWNLOADING WEB PAGES

FIELD OF THE INVENTION

This invention relates to the downloading of web sites on time division multiple access (TDMA) wireless packet data systems or wireline modem access protocols using sessions or applications protocols which use successive transmission control protocol (TCP) connections within a session. More specifically, this invention relates to methods of reducing the time overhead involved in such downloads, and reducing the number of random access contentions in such systems.

BACKGROUND OF THE INVENTION

When a client (web browser) initiates web access, a transmission control protocol/internet protocol (TCP/IP) connection is established between the client and the web server, as shown in FIG. 1. The connection is established utilising what is known as a three-way handshake. Firstly, the client sends a SYN (synchronise idle character) signal to the server, which in turn sends a SYN signal back to the client. The client then sends an acknowledgement signal to the server, thereby acknowledging receipt of the server's SYN signal and connection is complete.

Once a connection has been established between the client and the server, the client sends a hyper text mark-up language (HTML) request to the server. Such a request may be sent as a single TCP message or may be split into two such messages. The connection is characterised by what is termed a slow start mechanism. The client sends a single HTML request, awaits a response from the server, typically including the requested data, and sends an acknowledgement to the server. After transmission of the acknowledgement, multiple data signals are received from the server, such receipt is facilitated by the client. Once all data is received, the server sends a finish signal. A finish acknowledgement signal is sent from the client to the server, and then a finish signal.

The downloading of a web page involves several TCP/IP connection establishment and tear down sequences. This is because, if the web page to be downloaded comprises more than one inline image, a separate TCP session is required for the transfer of each image from the server to the client. FIG. 1 illustrates this problem, whereby once the finished signal 102 has been transmitted by the client, the client parses (checks) the downloaded page to see if more data is required. For the example of FIG. 1, an image requires downloading, so the above detailed connection establishment and tear down sequence is run again. In this instance, there is only a single data element which is less than 1 radio link control (RLC) packet to be sent, thus the server sends a single data signal followed by a finish signal. In this instance, the slow start mechanism is not invoked.

It is thus clear that, in order to download a web page containing a plurality of images, a number of TCP connections must be made between a client and a server. This is undesirable in terms of the time overhead for the overall download of a web page.

There exists a problem in accessing the worldwide web (WWW) using sessions or applications protocols which use successive TCP connections within a session on TDMA wireless packet data systems or wireline modem access protocols. This is illustrated hereinafter with reference to the use of hyper text transfer protocol (HTTP) on a global packet radio system (GPRS). When a browser sends an HTTP request, the request is transmitted as a SYN signal. However, every time a SYN signal is sent on GPRS there is a random access attempt made by the mobile station (MS) being utilised to connect to the network and thereby to a remote WWW server to facilitate the download of a required web page.

Upon the occurrence of a random access attempt, the MS sends a message to the network, via a base transceiver station (BS), that it has data to send. When the MS receives a signal from the network that it may send data, the MS is allocated a number of packets of future time in which to send that data. However, if there are two requests made to the network at the same time, collision of access attempts may occur. In this event, a SYN signal will not be transmitted by the network and the MS must make a further random access attempt later in time. This is known as random access contention resolution.

As will be explained below, the problem that exists is the necessity to establish a radio link control (RLC) link for every TCP/IP session. Radio link control is a protocol which controls the transfer of blocks of information between the MS and network. It performs sequenced delivery and error correction. The need to establish separate radio links increases substantially the delays experienced by the user in downloading a web page and the images contained therein. Delays are further accentuated given that the current form of RLC protocol requires that a countdown procedure is used to close down a link. Such a procedure consists of counting down the remaining number of blocks to be sent from a pre-set number to zero. The shut down of the link occurs upon zero.

The delays that occur during the download of a web page may best be appreciated by referring to FIG. 2, which shows a ladder diagram illustrating the message exchanges involved in the sending of a SYN message from client to server and from server to client. The following general assumptions have been made in the construction of the ladder diagram. It should be stressed that these assumptions are purely exemplary.

1. The major time delays are attributed to temporary block flow (TBF) establishment and wide area network (WAN) and data transfer time, such as satellite delay when making a transatlantic connection, for example.
2. The time overhead for the creation of an uplink TBF is larger than the time overhead for the creation of an uplink TBF whilst the downlink TBF is active.
3. The establishment of a downlink TBF has a time overhead less than that for the establishment of an uplink TBF.
4. Data transfers have an associated block error rate (BLER) of 10%.
5. The RLC roundtrip delay for data transfers is 10 RLC blocks.
6. Data is transferred at the lowest code rate (highest throughput).

The terminology used within these assumptions will become clearer in the light of the following description relating to FIG. 2.

As may be seen in FIG. 2, the connection between web browser and remote server on a GPRS involves various layers of control which interact with one another to enable communication links to be created. A browser communicates via a transmission control protocol (TCP) layer, which communicates with a logical link control (LLC) layer, which communicates with the mobile station radio link control (RLC-MS) layer. From here, messages are broadcast from MS to BS across a radio link formed therebetween. Messages received at the base station radio link control (RLC-BS) level are communicated to a logical link control/transmission control protocol (LLC/TCP) layer and thereon to the TCP layer of the remote server. Of course, this operates in reverse also.

Referring again to FIG. 2, the browser sends a HTTP request 2 which is sent as a SYN signal 4 by the TCP layer, this signal is sent on as a set synchronise balance mode (SABM) signal 6, by the LLC layer to the RLC-MS layer. At this stage an uplink TBF 10, a connection between MS and BS for the transfer of information in terms of RLC blocks, is established.

After establishment of the uplink, a TCP signal is passed on from the RLC-BS layer to the LLC/TCP layer as a connection indication (Conn-ind) signal 12. An acknowledgement signal 14 is sent back from this layer to the LLC layer which in turn sends an information frame 16, comprising TCP information and a SYN signal, back to the LLC/TCP layer. The next stage involves the sending of a SYN signal 18 from the LLC/TCP layer to the TCP remote server. This then sends a SYN signal 20 back, which is transmitted onwards to the RLC-BS as an SABM signal 22.

Now a downlink TBF-connection for transmittal of RLC blocks from BS to MS is established. This step is generally indicated as 24. After downlink establishment, a connection indication (Conn-ind) signal 26 is sent onwards to the LLC layer. This is acknowledged by acknowledgement signal 28 which passes across the air interface between MS and BS to the LLC/TCP layer. From there an information frame is sent across the radio link and onwards to the browser TCP layer.

Here it is assumed that the downlink TBF is closed after polling using the related reserved block period (RRBP). A BS may send a message with the RRBP set so that the MS must respond with an acknowledgement signal at the RLC level within a certain number of RLC blocks. If the RRBP does not require that the downlink remain open for such an acknowledgement, the downlink will be closed.

It is clear to see that these two signals, the first two depicted in FIG. 1, have taken a specific time ($\tau$) to be passed. Such a connection must be made a number of times in any one web page download operation. There is thus a problem in that the requirements for downloading web pages using HTTP on a GPRS can be very high. The stated problem becomes more significant when exemplified with regard to time periods. For the download of a single web page containing no images, three connection and tear down sequences must be carried out. One to establish that data is required, one to notify the server of what data is required and to receive the data, and a final one to acknowledge. Obviously, this will increase by the duration of a further connection and teardown sequence for every image to be downloaded. The problem requiring a solution is, therefore, how to reduce the time requirements for downloading a web page using sessions or applications protocols which use successive TCP connections within a session on TDMA wireless packet data systems or wireline modem access protocols, thus increasing efficiency and user satisfaction.

BRIEF SUMMARY OF THE INVENTION

The present invention aims to address some or all of the above disadvantages.

The present invention provides as claimed in the appendant claims, a method for enhancing sessions or applications protocols which use successive transmission control protocol (TCP) connections within a session on time division multiple access (TDMA) wireless packet data systems or wireline modem access protocols, wherein temporary block flows (TBFs) are chained. The present invention also provides methods for the reduction of web page download time and for the reduction of random access contentions in time division multiple access (TDMA) wireless packet data systems or wireline modem access protocols, and time division multiple access (TDMA) wireless packet data systems or wireline modem access protocols all utilising TBF chaining.

According to a preferred embodiment of the present invention, there is provided a method wherein an existing downlink TBF is utilised to request a rendezvous point from a network.

In another aspect of the present invention, there is provided a method wherein an existing uplink is utilised to request a rendezvous point from a network, prior to its closure.

In another aspect of the present invention, there is provided a method wherein a network maintains a downlink TBF constantly active.

The different aspects of the present invention may be utilised separately, or in any combination. They may also utilise the steps of determining the number of TCP sessions required to download an entire web page, and thereby transmitting information relating to the remaining number of required TBFs to a network.

BRIEF DESCRIPTION OF THE DRAWINGS

Additional specific advantages of the present invention are apparent from the following description of Figures in which.

DETAILED DESCRIPTION OF THE INVENTION

The present invention is now described with reference to the accompanying drawings as detailed above.

The present invention operates upon the basis that, if a TBF remains active in some way, even when no data is being transferred, there will not be required a stand alone TBF establishment for each communication between the MS and the network. This is termed TBF chaining.

Figure 3:
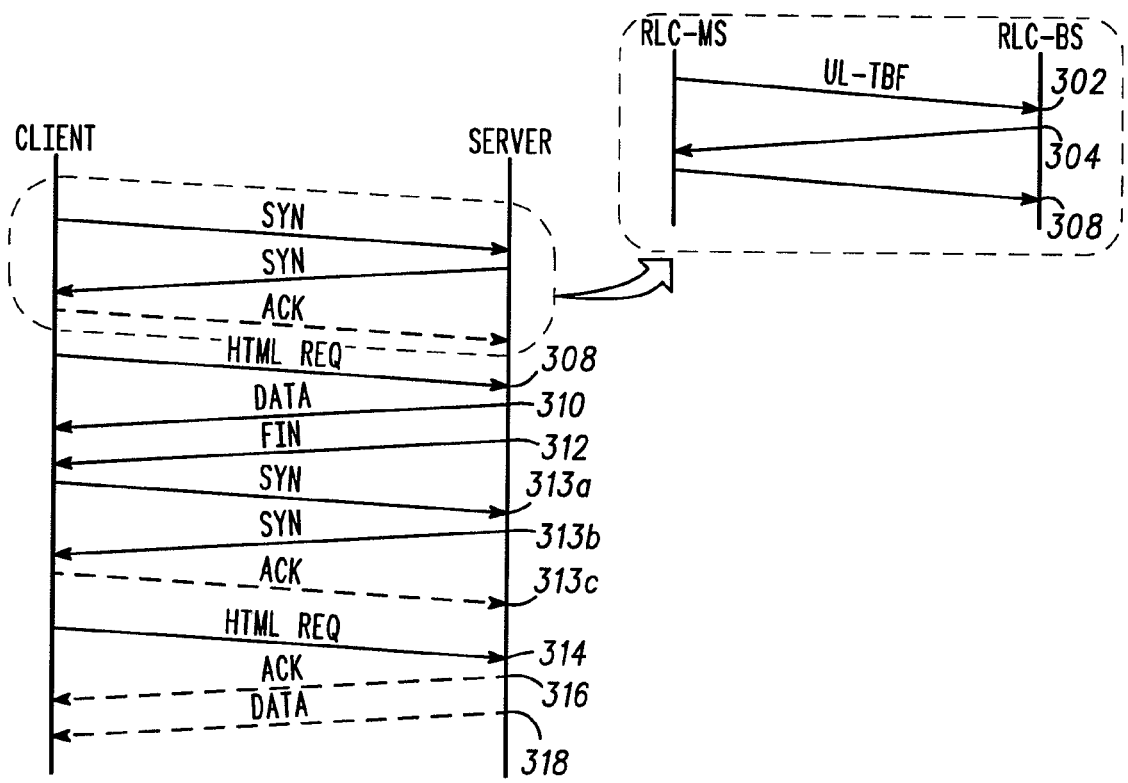
FIG. 3 shows a ladder diagram depicting the scenario in which a connection between client and host remains open.

As may be seen from FIG. 3, once an uplink TBF has been established, 302, 304, 306 between the RLC-MS and RLC-BS of the client and server, an HTML request may be sent 308 which will result in data and finish signal 310, 312 being passed back from the server to the client. At this stage, the uplink TBF remains active. It is thus possible for transmission 318 to occur thereafter, after a RLC/MAC channel resource assignment procedure. There is no need to create an uplink TBF connection with its associated time overheads. This result is achieved in a number of different ways which are described below with reference to FIGS. 4 to 9.

Figure 1:
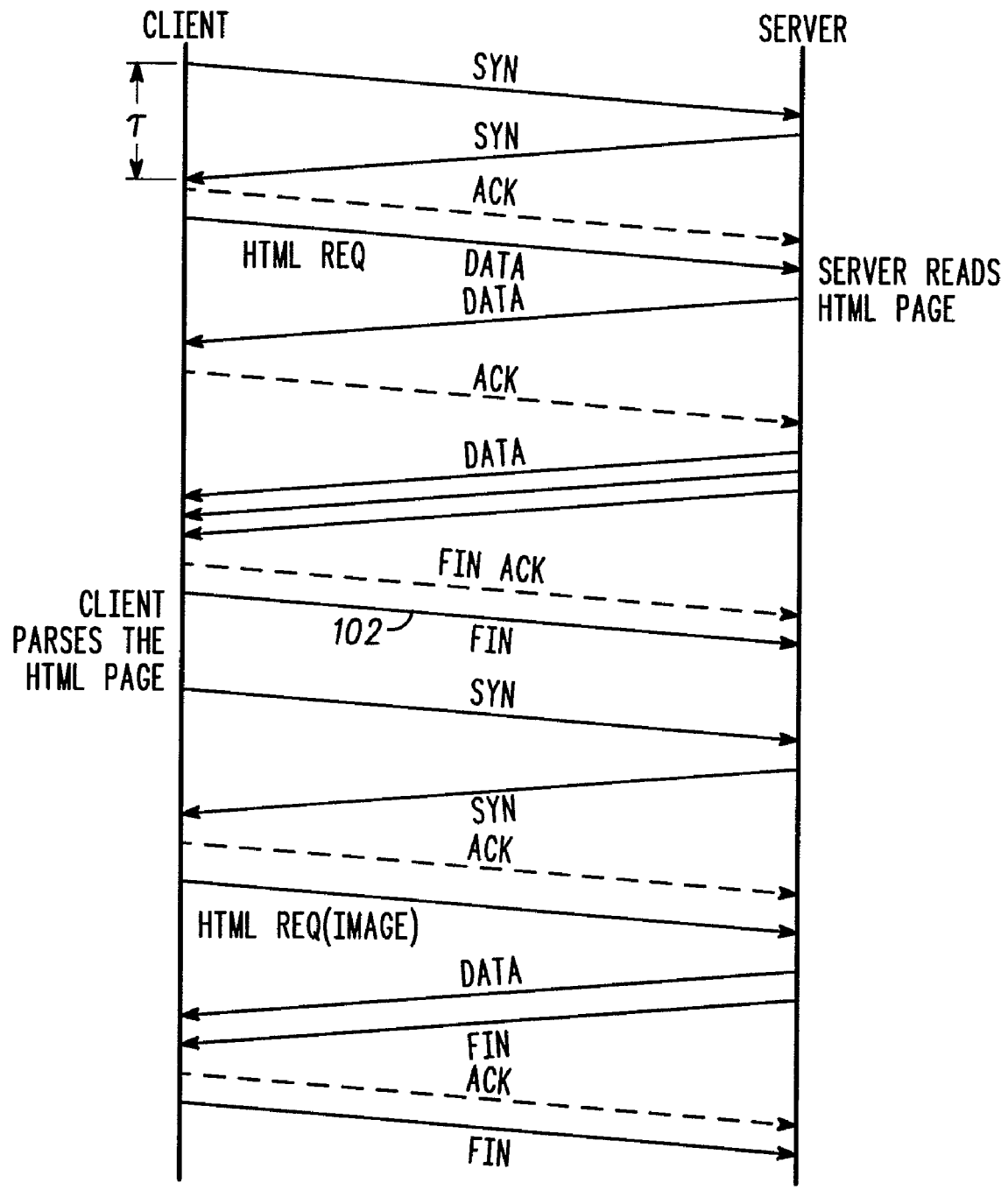
FIG. 1 shows the messages exchanged between a client and a server during the download of a web page.
Figure 2:
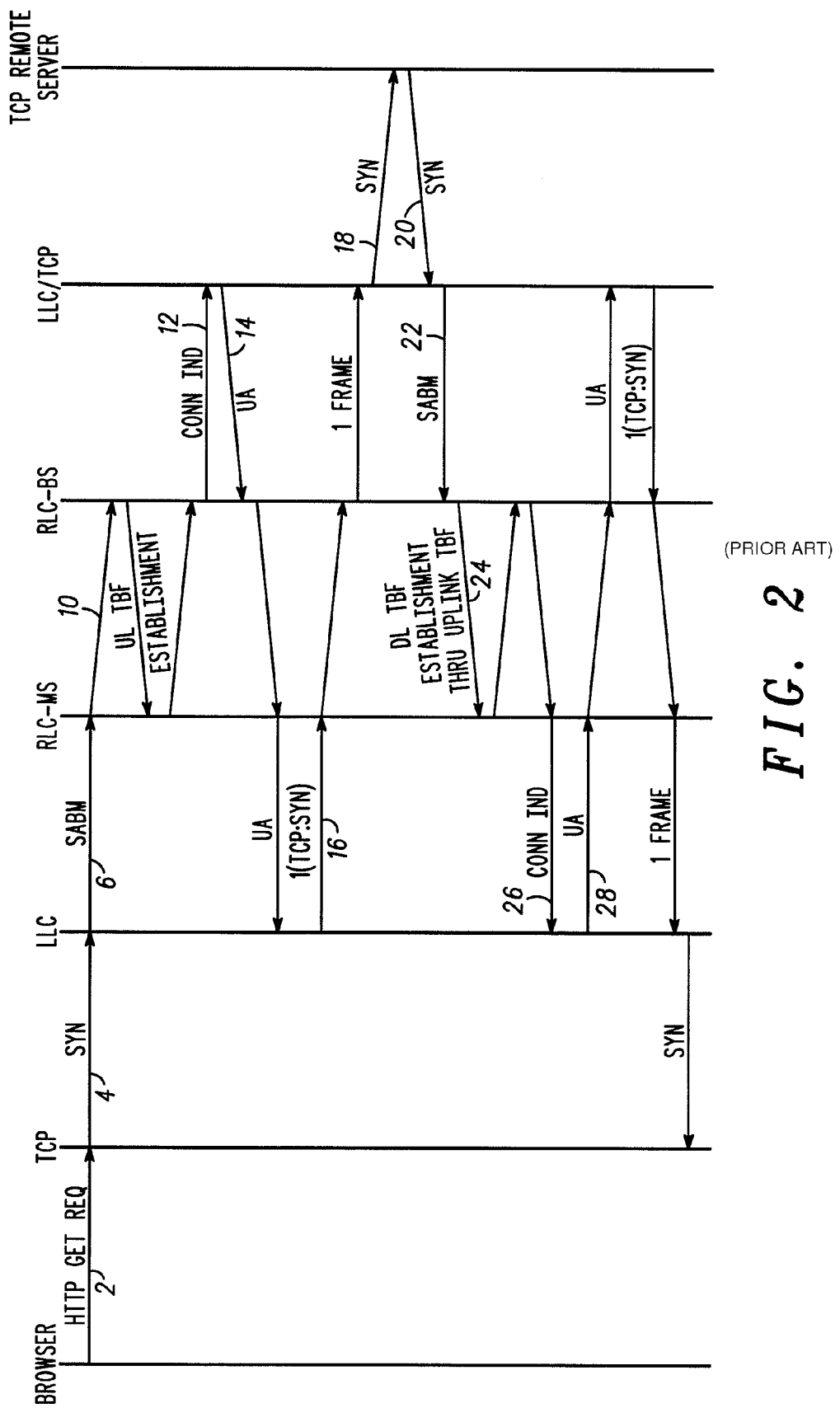
FIG. 2 shows the messages exchanged during the first two signals in a three-way handshake using HTTP on a GPRS.
Figure 4:
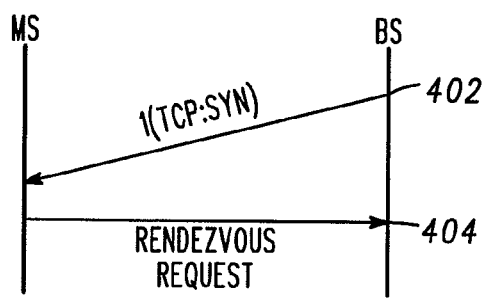
FIG. 4 shows a ladder diagram depicting a rendezvous request.

FIG. 4 shows the messages passed between an MS and a BS when a downlink TBF is used to request a rendezvous point from an uplink TBF. FIG. 4 is representative of an extract of a ladder diagram showing messages passed between an MS and BS. The first signal 402, an LLC level signal, passed from BS to MS is representative of the last communication sent through an established downlink from a BS to an MS. After receipt of this signal, and prior to downlink closure, the MS sends a request for a rendezvous, an RLC level signal. In other words, the MS sends a message back through the downlink, before its closure, indicating that it may want to transmit something based upon TCP/HTTP conditions. In effect, when RRBP is polled (c.f. FIG. 2), the MS sends a message to the BS requesting resource. The MS provides details of the minimum number of RLC blocks before the expiry of which it will not be ready to transmit data. In response to this, the BS allocates a contention free resource for this purpose. This resource consists of a block of time allocated solely for the use of the MS. The block is located a certain number of RLC blocks after request and is named a rendezvous point.

The block allocated for the use of the MS enables the MS to inform the BS of whether it has any more data to transmit. Thus, the MS may use this block to request necessary resource for data to be transferred from the server to a client, or to indicate that it has nothing further to transmit, or to request a further rendezvous point.

This procedure reduces the time to create an uplink TBF from the uplink TBF establishment time (standalone) to the time taken to create an uplink TBF through a downlink TBF. However, it should be noted that the bandwidth of the allocated RLC block is wasted if the MS has nothing further to transmit when the rendezvous point is reached, and thus does not use the allocated RLC block. Additionally, the number of random access contentions occurring is reduced because resource for an uplink request has already been allocated.

The time for which the rendezvous point is requested is calculated using time and data which the MS maintains. The MS maintains a timing record per each web or internet protocol (IP) address (or for a limited number of addresses in a circular storage area). It also maintains a timing record at the radio link control/media access control (RLC/MAC) level (previously termed solely RLC) for the network currently in service. For each IP address, the RLC/MAC network interface used during the measurement is stored. In order to maintain such records, the MS measures the following timings when they are required and in accordance with what is allowed by the various protocols involved. The MS may use any method for maintaining measurements. Such methods may include averaging over a number of previous measurements or simply using the latest measurements:

1. The stand alone uplink establishment time. This is the RLC/MAC uplink TBF establishment time, and is the time between the first random access attempt and the receipt of a "packet assignment" message (a message indicating the assignment of resources for transmission of data on an uplink).
2. The stand alone downlink establishment time. This is the time between the receipt of a "packet downlink assignment" message and the receipt of a first valid RLC block.
3. The uplink TBF establishment time whilst a downlink TBF is still active.
4. The downlink TBF establishment time whilst an uplink TBF remains active; and
5. The TCP roundtrip time. This is the time for a TCP message to be transmitted from the TCP layer of a client or MS, to the TCP layer of a server (remote or otherwise) and back to the MS.

In addition to the above parameters, the MS also takes into consideration the uplink and downlink data rates and their respective block error rates when determining the desired time for rendezvous point locations.

Figure 5:
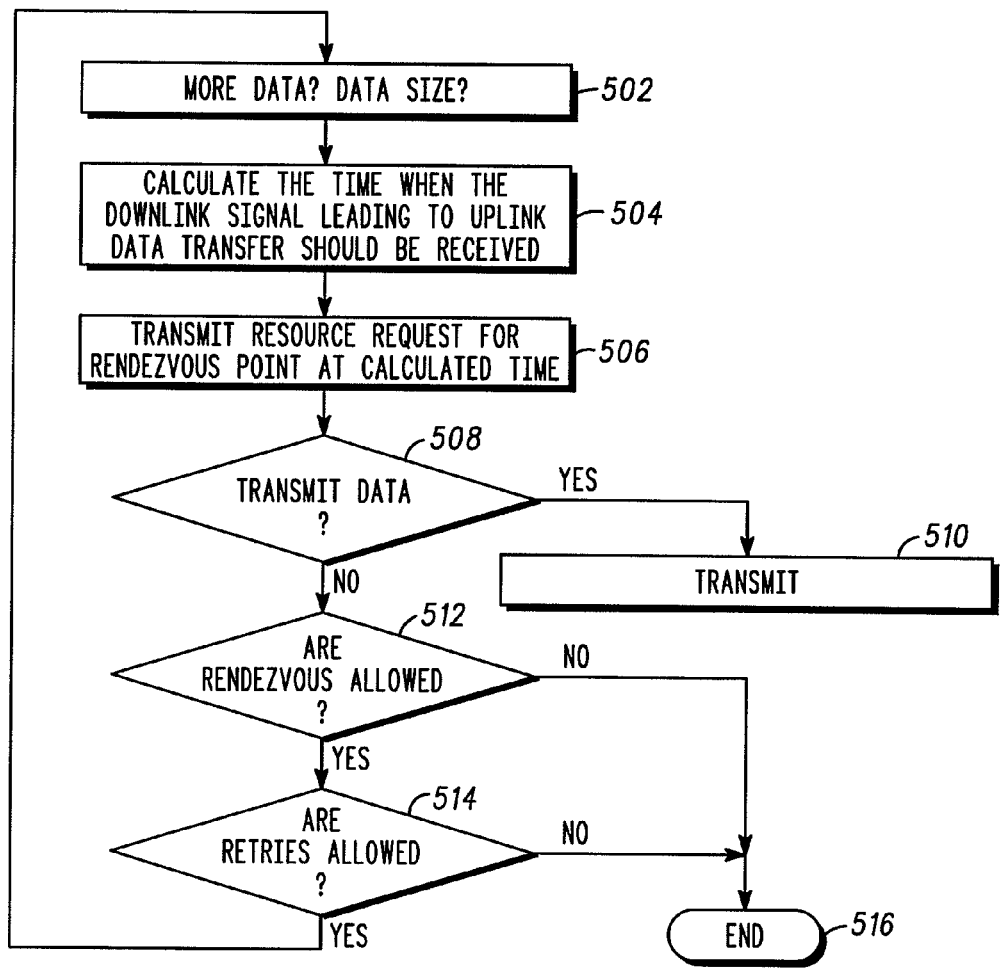
FIG. 5 shows a flow diagram illustrating a time location calculation for the rendezvous of FIG. 4.

FIG. 5 illustrates how an MS of the embodiment of FIG. 4 requests a rendezvous point. In function box 502, the MS determines whether more data needs sending and also the size of the remaining data. This is determined from the condition of the HTTP and/or the TCP. This can occur at any time in which a downlink TBF is active.

In function box 504, the MS waits until it knows the size of the downlink TCP message which is currently being sent. The MS then calculates the time at which it should have received the complete downlink message, taking into consideration the downlink data rate and block error rate. The calculation also takes into account the messages which need to be transacted at different levels of control within the client/server interface.

Function box 506 details the resource request transmission step. Here the MS transmits a request for 1 RLC block of uplink at a rendezvous point equal to the time determined in function box 504. The TCP roundtrip time is used as a benchmark to prevent the rendezvous point from being requested for a time that is too early. If the requested point falls at a time sooner than a TCP roundtrip time, the network would be ready to establish resources before there is anything to send. Similarly, if the time until the rendezvous point is much longer than either of the RLC uplink TBF establishment times, or if the uplink TBF is active, the request is not sent. The network reserves the right to allow, delay, or reject any request for resource.

Function box 508 depicts a decision which is made by the MS. If, after the number of blocks between the rendezvous request and the allocated block, the MS has more data to transmit, then that data is transmitted to the BS, as detailed in function box 510. However, if the MS has no further data to transmit it is determined (function box 512) whether rendezvous requests are allowed. This is done by the MS listening to the network's system information messages which are broadcast continuously. The network sets a bit within these messages to indicate whether rendezvous requests are accepted. The MS will listen to this information before making a call.

If rendezvous requests are accepted, it is established (function box 514) whether rendezvous request retries are allowed. This information is available in the same way as detailed for whether rendezvous requests are accepted.

If both requests and retries are accepted, function box 502 is returned to. However, if either, or both, of these requests are not accepted by the network, communication between the MS and network comes to an end (function box 516).

Figure 6:
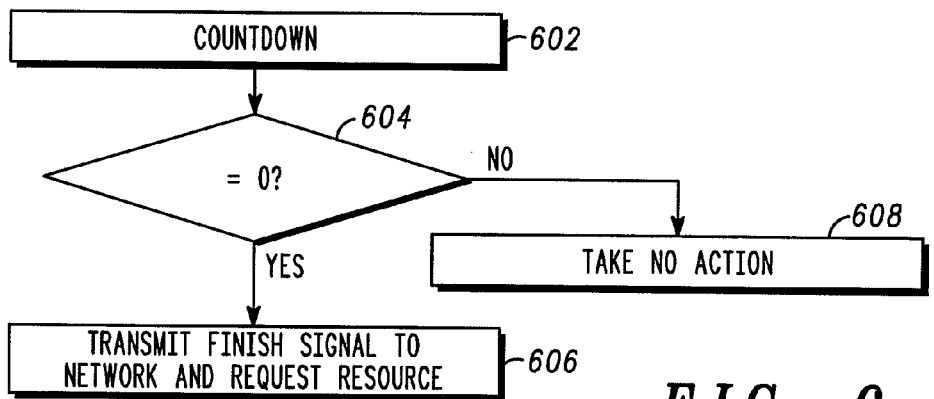
FIG. 6 shows a flow diagram illustrating a method of TBF chaining using a closing uplink.
Figure 7:
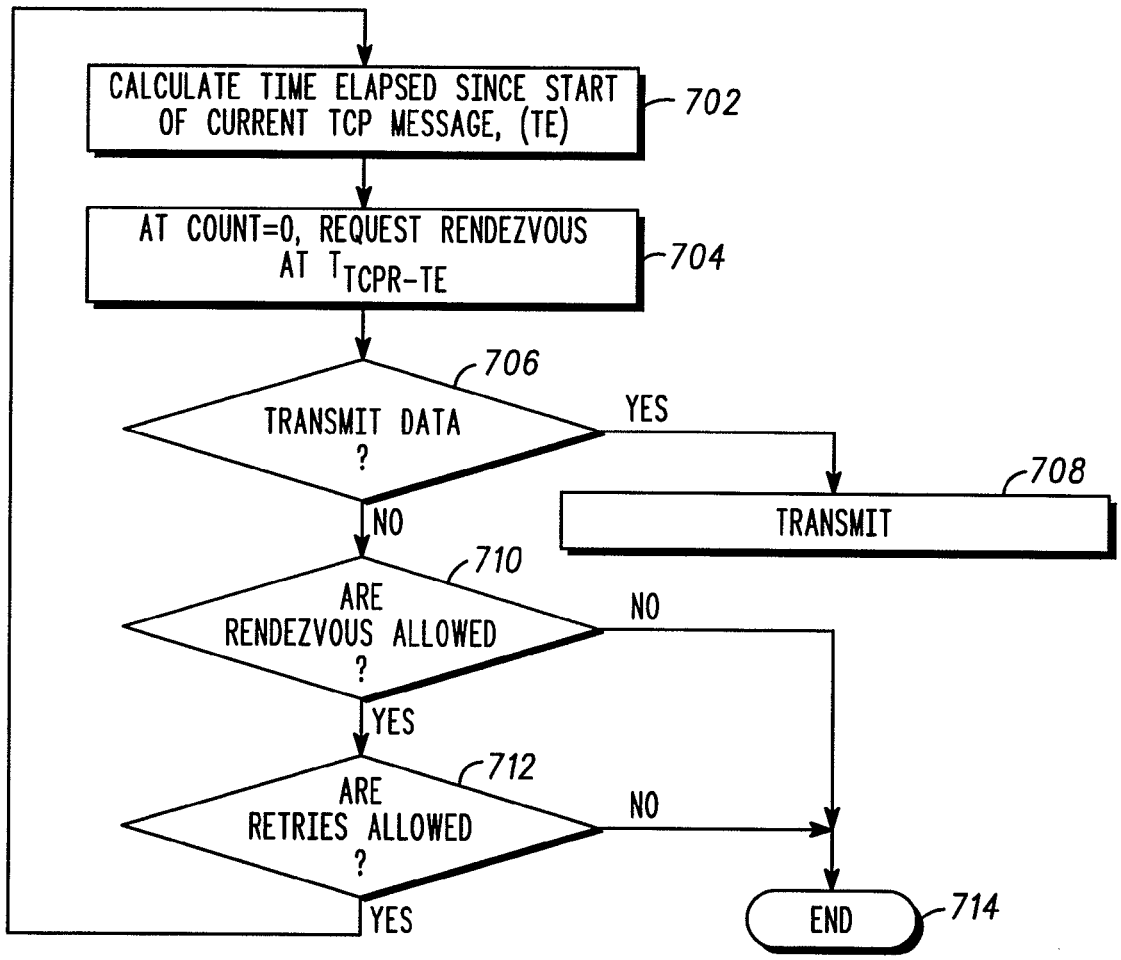
FIG. 7 shows a flow diagram illustrating a time location calculation for the rendezvous point of FIG. 6.

A second method of chaining TBFs is depicted in FIG. 6. In this method, an MS utilises the countdown procedure of the RLC level in requesting a rendezvous point for the next uplink TBF.

Function box 602 indicates the RLC countdown. The RLC protocol requires that as the MS starts to have fewer blocks of data to send, it must inform the network. As such, a countdown, from a pre-set number of blocks remaining to be transmitted, to zero, is carried out. This allows the network to be informed of how much data remains, and when transmission will be completed. When the count reaches zero, the end of the data is also reached. In this embodiment, the MS parallels the countdown and, when the countdown is equal to zero (function box 604), the MS sends a request for a single resource to be allocated. The block is requested to be allocated at a future time, for the purpose of requesting data transfer. As such, the MS indicates a rendezvous point for the allocation of a block. This is carried out at the same time as the existing uplink TBF is closed. Whilst the countdown is not equal to zero, the MS takes no action in this regard (function box 608).

This method is advantageous in that as a block has already been allocated for requesting resource for the next uplink TBF, the contention resolution procedure inherent in random access attempts, as explained earlier, is avoided. This reduces the time overhead for establishing further uplink TBFs (i.e. uplinks established after the first or primary uplink) from the standalone uplink establishment duration to that of the uplink establishment through an open downlink.

The rendezvous request procedure utilised in the embodiment of FIG. 6 uses the same parameters as that of FIG. 5. However, the process of requesting a rendezvous point differs and is described with reference to FIG. 7.

Function box 702 depicts the first step in the process of requesting a rendezvous point. This step requires that knowledge of the current TCP roundtrip time is available for use. The MS calculates the time elapsed since the start of the current TCP message at the point in time where the decision to request a rendezvous point is made, which is ascribed the symbol $T_E$. The next step, detailed in function box 704, takes place when the RLC countdown has reached zero. Here, the MS requests a rendezvous point at a future time given as the difference between the TCP roundtrip time ($T_{TCPR}$) and time value calculated in step 702. Again, the network reserves the right to either admit, delay or reject the received request. Function box 706 details the decision taken by the MS as to whether or not it has further data to transmit, in the form of an acknowledgement signal or request for resource for example, when the rendezvous point is reached. If the MS has further data, that data is transmitted as shown in function box 708. Otherwise, it is determined (function box 710) whether rendezvous requests are allowed. This is done by the MS listening to the network's system information messages which are broadcast continuously. The network sets a bit within these messages to indicate whether rendezvous requests are accepted. The MS will listen to this information before making a call.

If rendezvous requests are accepted, it is established (function box 712) whether rendezvous request retries are allowed. This information is available in the same way as detailed for whether rendezvous requests are accepted.

If both requests and retries are accepted, function box 502 is returned to. However, if either, or both, of these requests are not accepted by the network, communication between the MS and network comes to an end (function box 714). It should be noted that one or more correction factors may be utilised within this procedure.

Figure 8:
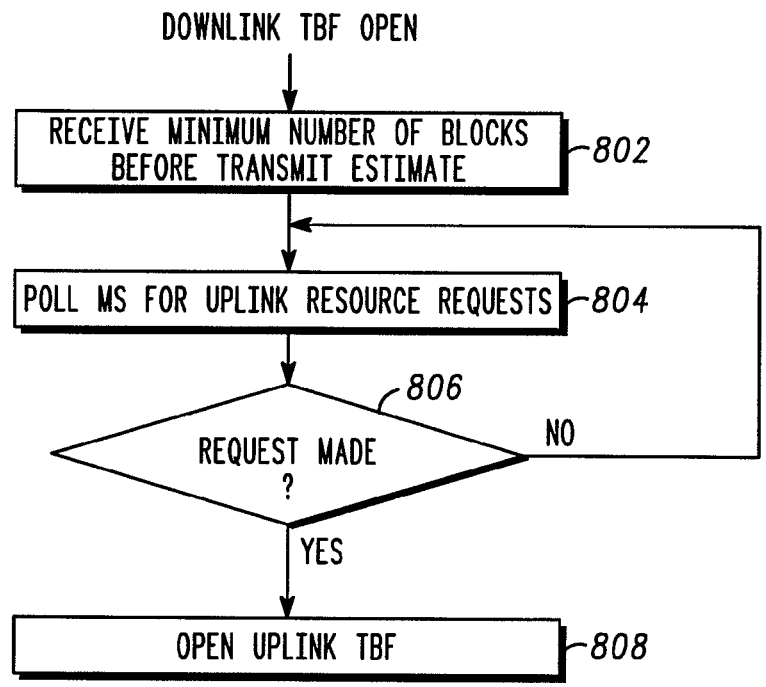
FIG. 8 shows a flow diagram illustrating a method of TBF chaining wherein a downlink remains always active.

A third method of chaining TBFs, wherein a network retains an open downlink TBF at all times, is described with reference to FIG. 8. As may be seen from FIG. 8, this method relies upon the downlink TBF (c.f. 24, FIG. 2) being kept open by a BS after an HTTP or TCP/IP session transaction has been carried out.

Function box 802 details the step of the BS receiving an estimate from the MS of the minimum number of future RLC blocks before which it will not be able to transmit further data. This information is sent as often as the MS can send it along with information detailing the current roundtrip TCP delay being experienced.

The next step 804 consists of the BS polling the MS periodically to see whether the MS has made any uplink resource requests. If a request has been made, an uplink TBF is established 806, 808 at the smaller of the two establishment overheads detailed earlier because the downlink TBF remains open. If no request has been made, the BS continues to poll the MS periodically.

This method provides a network control procedure. If a BS is, at a particular time, dealing with a high proportion of network traffic, it may choose not to poll an MS for resource requests. The BS may delay the time when it will next poll an MS. Thus, this method provides a mechanism controlled by the network for dealing with collisions. Random access contentions may be avoided, because when they are likely to occur, the BS merely delays the polling of the MS. A contention free resource is therefore provided. This method provides the same time saving as the previous methods.

Figure 9:
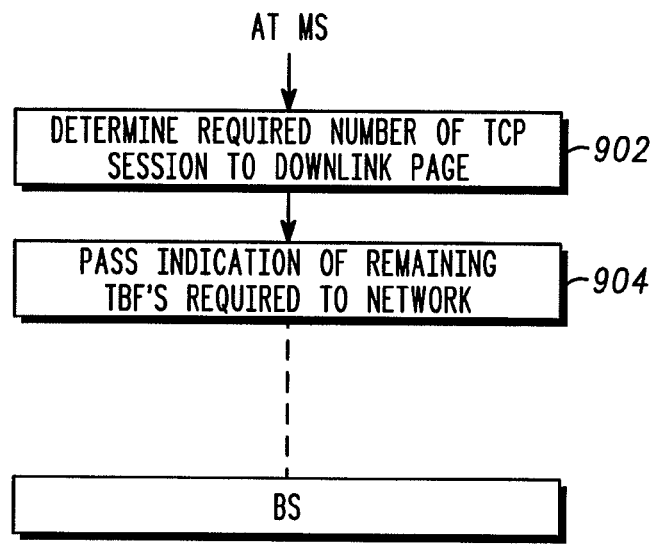
FIG. 9 shows a flow diagram illustrating a method of informing a network of status information.

A final method, complementary to the chaining of TBFs, is detailed in FIG. 9. This method may be used with any of the above three methods of chaining. This method begins in an MS. The MS, step 902, determines the number of TCP connections/tear down sequences which will be required in order to download a web page. As already explained, an individual sequence is required for each inline image to be downloaded. This step utilises HTTP page parsing.

In function box 904, an indication of the number of TBFs still requiring establishment in order to complete the download is passed to the network. This indication is made by means of a counter. In addition, the MS can indicate the number of octets (bytes) of data that it may have to transfer on the uplink in future TBFs. This occurs particularly in uploads wherein the nature of events is similar.

The above methods may all be employed together to provide TBF chaining in download of web pages using HTTP on a GPRS. However, the most likely and preferred combinations are the embodiments of FIGS. 4, 8 and 9, and the embodiments of FIGS. 6, 8 and 9.

The above methods, however combined, serve to reduce the time overhead of TBF establishment using HTTP in a GPRS. The gains achieved by the use of TBF chaining, in an exemplary download scenario, are now described. In the download of a page containing four images, five TCP connections would be required. One for the page, and one for each image. For each of these connections there will be up to four uplink TBF establishments and up to three downlink TBF establishments. It is thus obvious that reducing the time taken to establish each such link will significantly reduce the overall time overhead for a download. Also, as HTTP improves, bottlenecks will only remain in the form of the TCP roundtrip time for connection establishment and slow start. Further, chaining TBFs provides noticeable improvements in the most desirous area.

There is also a band width gain associated with TBF chaining. As the number of messages exchanged between control levels in both client and server (i.e. in order to establish a connection) is reduced, fewer RLC blocks are required in order to connect. Thus, more RLC blocks are available to the user for data transfer, etc. Further, the reduction in the number of random access contentions results in a significant reduction in collisions, which has an associated saving in time, as previously described.

The above detailed description provides for methods of improving the use of HTTP on GPRS's and GPRS systems utilising such methods, for predicting rendezvous points, and for avoiding collisions and contention resolution in a GPRS utilising HTTP. These methods have been described as relating to GPRS, but apply equally to any time division multiple access (TDMA) wireless packet data system and any wireline modem access protocol. Further, whilst the methods and systems of this invention have been described with reference to hyper text transfer protocol, they apply equally to any sessions or applications protocols utilising successive transmission control protocol (TCP) connections within a session.

It will be of course be understood that the present invention has been described by way of example only, and that modifications of detail may be made without departing from the scope of the invention.

The invention claimed is:

1. A method of downloading data using sessions or applications protocols which use successive transmission control protocol (TCP) connections within a session on time division multiple access (TDMA) wireless packet data systems and wireline modem access protocols, the method comprising the steps of:
   chaining temporary block flows (TBFs) by a client for providing communication between the client and a server of network to enable the client to download data from the server; and
   requesting a rendezvous point by the client, using an existing downlink TBF, from the server for allocation of resource to the client at a future time after the rendezvous request, wherein said rendezvous point is requested to be located at a point in time when an uplink TBF is required.

2. A method according to claim 1, wherein the sessions or applications protocols include hyper text transfer protocol (HTTP) and the TDMA wireless packet data system and wireline modem access protocols include global packet radio systems (GPRSs) and enhanced GPRSs (LGPRSs).

3. A method according to claim 2, wherein the server to which a request for the rendezvous point has been made may accept, reject or delay the request.

4. A method according to claim 2, further comprising the steps of:
   determining by the client the number of TCP sessions required to download a web page; and
   transmitting by the client an indication of the remaining required TBFs to the server.

5. A method according to claim 4, further comprising the steps of transmitting by the client to the server an estimate of the size of the data to be uploaded in future TBFs.

6. A method according to claim 1, comprising the step of the server maintaining an existing downlink TBF as active.

7. A method according to claim 6, further comprising the steps of:
   receiving an estimate from the client of the minimum number of RLC blocks associated with the existing downlink TBF before which it will have nothing to transmit; and
   polling the client for an uplink resource request.

8. A method according to claim 7, comprising the step of, if a resource request is identified, opening by the server an uplink TBF between the client and the server.

9. A method of enhancing sessions or applications protocols which use successive transmission control protocol (TCP) connections within a session on time division multiple access (TDMA) wireless packet data systems and wireline modem access protocols, the method comprising the steps of:
   chaining temporary block flows (TBFs) by a client for providing communication between the client and a server of a network; and
   utilizing an existing downlink TBF by the client to request the rendezvous point from the network for allocation of resource to the client at a future time after the rendezvous request, wherein said rendezvous point is requested to be located at a point in time when an uplink TBF is required.

10. A method according to claim 9, wherein the rendezvous point location is calculated, said calculation comprising the steps of:
    determining by the client whether data needs sending to the server, and determining the size of the data; and
    estimating by the client the time when the existing downlink signal should be complete.

11. A method according to claim 9, wherein the rendezvous point comprises a single radio link control (RLC) block of uplink.

12. A method according to claim 11, further comprising the step of, if the rendezvous point is allowed by the server, when the rendezvous point is reached, and if data to be transmitted is present, utilising by the client the block of uplink to request an uplink TBF.

13. A method according to claim 12, further comprising the steps of:
    if the rendezvous point is rejected by the server, determining by the client whether rendezvous requests are accepted by the server;
    if rendezvous requests are accepted by the server, determining by the client whether re-requests are accepted by the server; and
    if re-requests are allowed, repeating the rendezvous request procedure.

14. A method of enhancing sessions or applications protocols which use successive transmission control protocol (TCP) connections within a session on time division multiple access (TDMA) wireless packet data systems and wireline modem access protocols, the method comprising the steps of:
    chaining temporary block flows (TBFs) by the client for providing communication between a client and a server of a network; and
    utilising an existing uplink TBF by the client to request the rendezvous point from the server for allocation of resource to the client at a future time after the rendezvous request, wherein said rendezvous point is requested to be located at a point in time when an uplink TBF is required.

15. A method according to claim 14, wherein the request is made as data transmission ends.

16. A method according to either of claim 14, wherein the request is made as an RLC counter reaches zero.

17. A method according to any of claim 14, wherein the rendezvous point is calculated according to the following steps:
    calculating by the client the time lapsed since transmission of a current TCP message; and
    estimating the rendezvous point by the client as the difference between the elapsed time and a TCP roundtrip time taking account of any required correction factors.

18. A method according to any of claim 14, wherein the rendezvous point comprises a single RLC block of uplink.

19. A method according to claim 18, further comprising the step of, if the rendezvous point is allowed by the server, when the rendezvous point is reached, and if data to be transmitted is present, utilising by the client the block of uplink to request an uplink TBF.

* * * * *